(12) United States Patent
Farenholtz et al.

(10) Patent No.: US 6,719,566 B2
(45) Date of Patent: Apr. 13, 2004

(54) TRAINING MANIKIN SUPPORT

(75) Inventors: Douglas William Farenholtz, Abbotsford (CA); David N. Broussard, Gatesville, TX (US)

(73) Assignees: PTM Equipment, Inc., Abbotsford (CA); Medical Plastics Laboratory, Inc., Gatesville, TX (US)

( * ) Notice: Subject to any disclaimer, the term of this patent is extended or adjusted under 35 U.S.C. 154(b) by 0 days.

(21) Appl. No.: 10/066,568

(22) Filed: Feb. 6, 2002

(65) Prior Publication Data

US 2002/0106619 A1 Aug. 8, 2002

Related U.S. Application Data

(60) Provisional application No. 60/267,141, filed on Feb. 8, 2001, now abandoned.

(51) Int. Cl.[7] .............................................. G09B 23/32
(52) U.S. Cl. ..................... 434/267; 434/274; 482/133
(58) Field of Search ............................... 434/262, 267, 434/274; 482/133, 135, 136, 137; 248/122.1, 123.11, 125.7, 176.1

(56) References Cited

U.S. PATENT DOCUMENTS

| | | | | |
|---|---|---|---|---|
| 5,549,499 A | * | 8/1996 | Foskey et al. | 446/268 |
| 5,967,470 A | * | 10/1999 | Guschlbauer | 248/121 |
| 6,005,176 A | * | 12/1999 | Yu | 84/327 |
| 6,220,459 B1 | * | 4/2001 | Runyon | 211/85.6 |

* cited by examiner

*Primary Examiner*—Kien T. Nguyen
(74) *Attorney, Agent, or Firm*—Merek, Blackmon & Voorhees, LLC

(57) ABSTRACT

A support for a manikin is provided having a pair of opposed upstanding extension members forming a cradling surface to support a manikin. One of the extension members is biased in an inward direction toward the second extension member to return to a normal position and moveable from the normal position in an outward direction away from the other extension member upon application of a pre-determined force on the extension member.

30 Claims, 9 Drawing Sheets

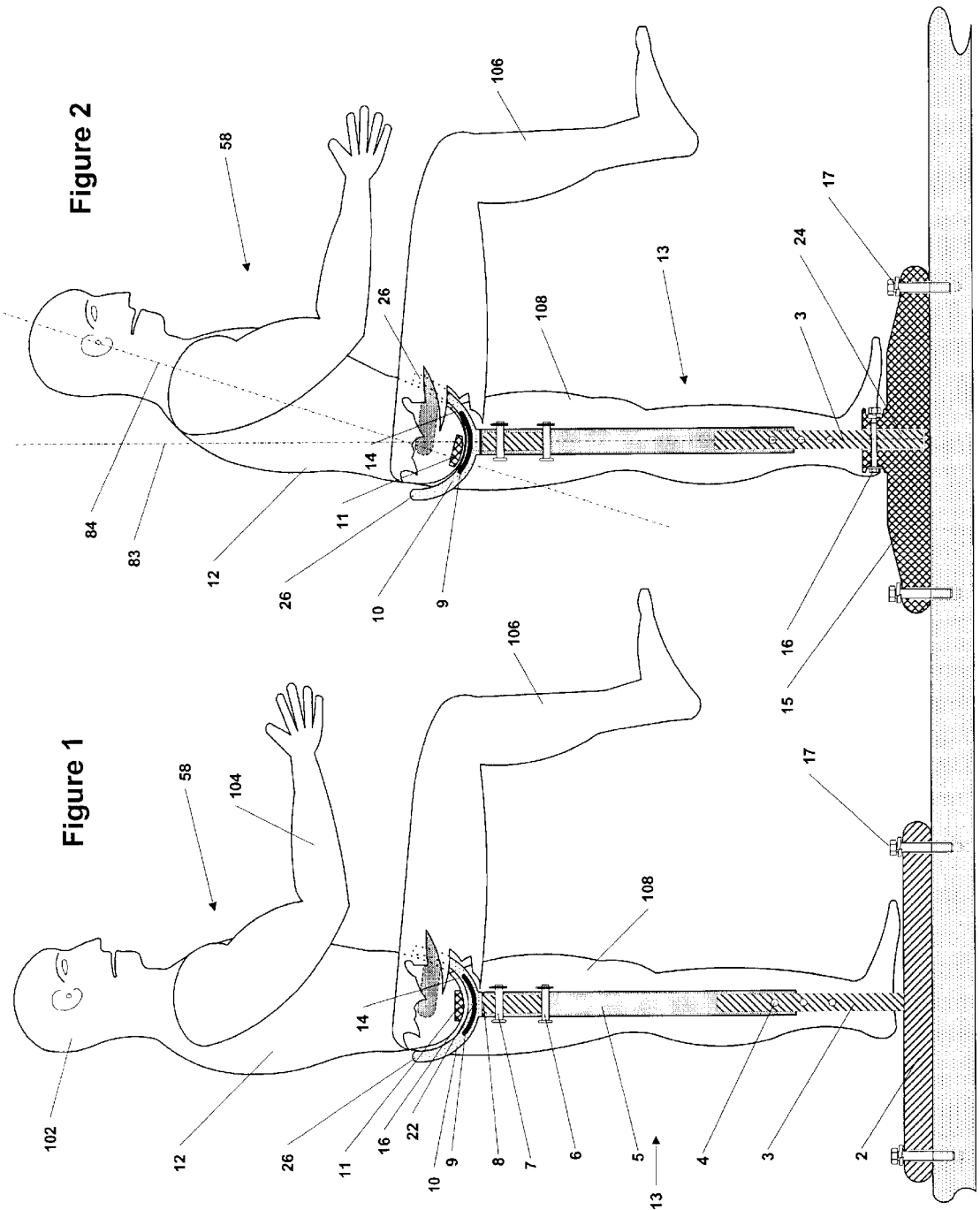

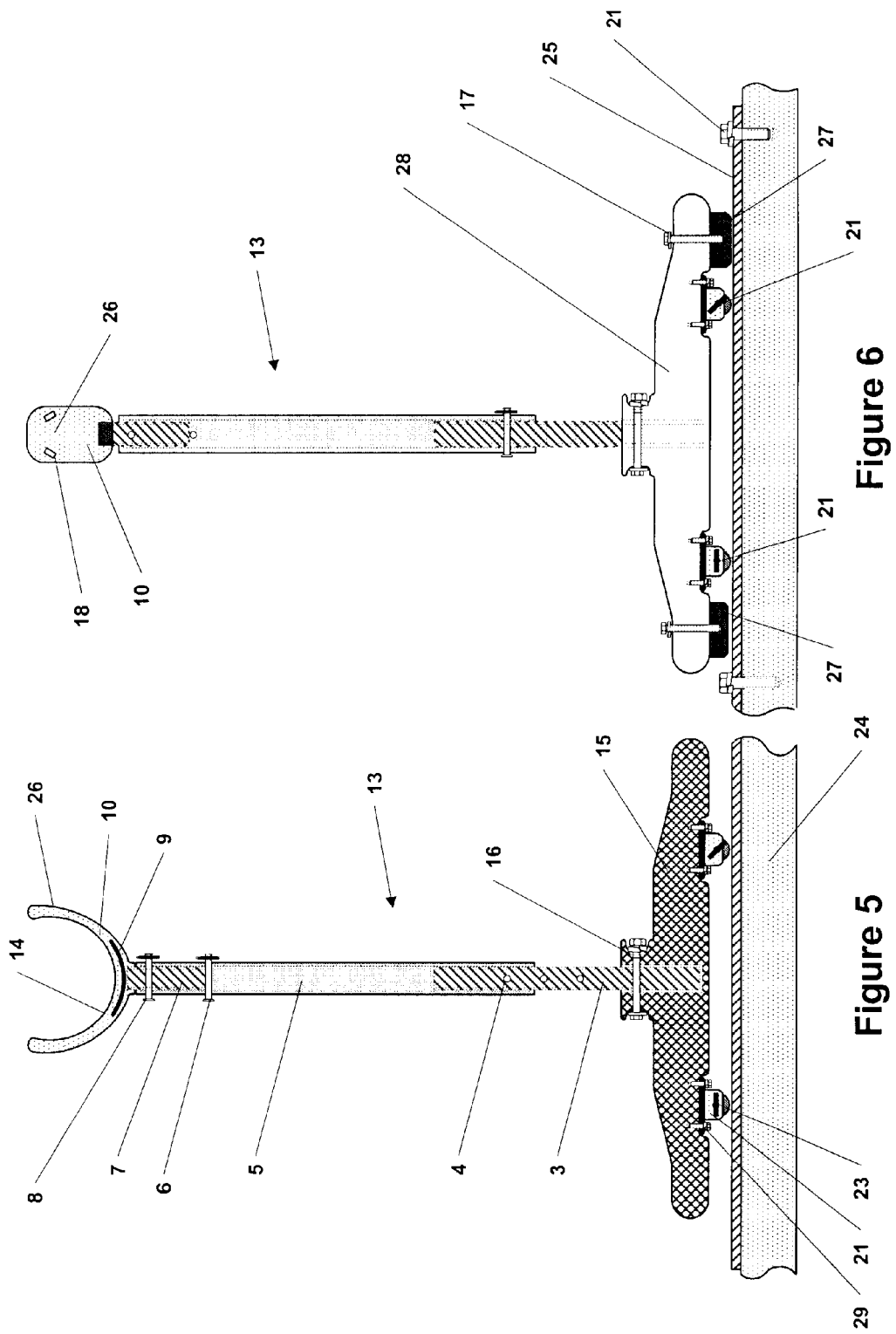

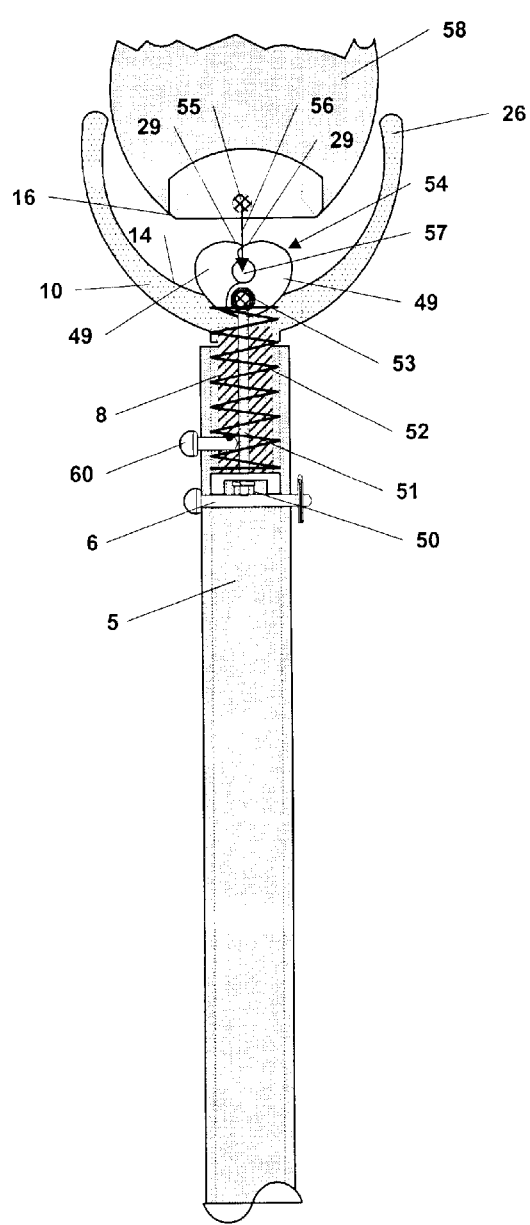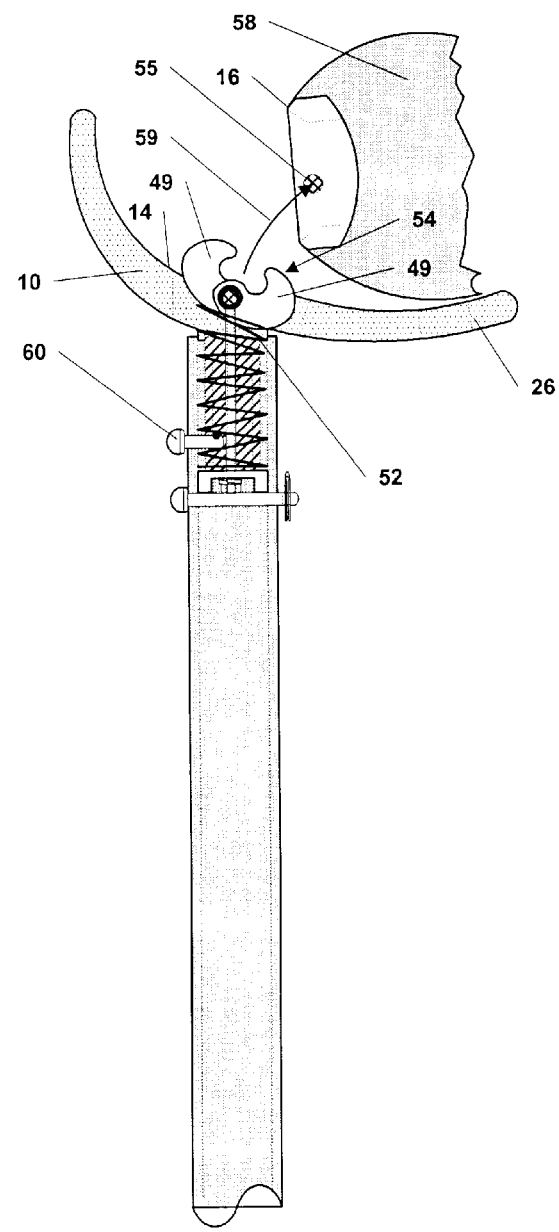
Figure 9
Figure 10

TRAINING MANIKIN SUPPORT

This application claims the benefit of U.S. Provisional Application No. 60/267,141 filed Feb. 8, 2001, the contents of which are incorporated herein by reference.

BACKGROUND OF THE INVENTION

This invention is directed to a support system that is designed to support an anatomically correct human form training manikin in an upright standing or semi- upright position. The invention is more particularly directed toward a support for a manikin which pen-nits the manikin to be realistically released from the support in the performance of a throwing, tripping, sweeping, pulling or pushing skill such as might be applied while practicing the sport of judo, wrestling or other martial arts sports, throughout a full and unrestricted 360 degrees about the manikin. This invention is also directed to a robotically controlled motor for moving a base member onto which the support is mounted to enable the practice of martial arts skills on a moving manikin target.

It is important in developing useful training devices that participants are able to practice their skills as realistically as possible. Often in training law enforcement recruits in defensive and control tactics and other martial arts based training, the objective is to control the suspect/opponent by forcing or otherwise throwing the suspect/opponent from a standing position to the ground whereupon the law enforcement officer would restrain the suspect or the martial artist would gain his/her credit. It is important to simulate as much as possible the unencumbered actual stance positions of a suspect or a training partner/opponent and to enable trainees to move the manikin and in some cases remove the manikin from the support, if a skill is to be practiced realistically. Thus, there is a need for a support for a manikin that will support the manikin in a realistic standing position and upon application of a pre-determined force as undertaken during a training simulation, penmit rotation or deflection of the manikin in the support or complete removal of the manikin in a realistic manner. This generally requires a horizontal deflection or rotational movement of the manikin in the support or in the process of removing the manikin from the support.

Human form training manikin, such as those disclosed in U.S. patent application Ser. No. 09/531,593 (Farenholtz) require support in order to remain in an upright standing position. U.S. Pat. No. 5,152,733 issued Oct. 6, 1992 (Farenholtz) discloses a system that provides for a training manikin to be mounted and supported on a support arm. In this way martial arts participants are able to move around the training manikin albeit with the undesirable effect of the support arm encumbering their performance and desired practice. This invention eliminates a horizontal support arm by placing the support and its base between the legs of the training manikin. The design of this training manikin support system permits the user to perform striking and/or throwing skills unencumbered through a full 360 degrees around the training manikin.

There is also a need for the training manikin to move more realistically on its support or be more realistically removed from its support in response to forces applied to it by participants. This invention includes a training manikin with a support and methods of use by which the training manikin will respond to levels and types of forces that are applied in a more realistic manner. For example, while a support may be employed which cradles the manikin between a pair of opposed extension members holding the manikin in an upright standing position, unless those extension members are deflectable they will interfere with the horizontal, or rotational, movement of the manikin in the support requiring the lifting of the manikin in an unrealistic manner in order to move the manikin horizontally or rotate it.

In another aspect of the invention a motorized controlled by a computer is provided which will cause the training manikin to move according to the commands of a computer.

SUMMARY OF THE INVENTION

A support for a manikin includes first and second opposed extension members when normally positioned cooperating to form a cradling surface to support a manikin, a base member connector for connecting for connecting the extension members to a base member, the first extension member biased in an inward direction toward the second extension member to return to its normal position and moveable from its normal position in an outward direction away from the second extension member upon application of a pre-determined force on the first extension member. When the manikin is supported in the cradling surface the manikin may be moved in an outward direction on movement of the first extension member in an outward direction on application of the pre-determined force. The first extension member may be resiliently deformable so as to be moveable in the outward direction on application of the pre-determined and due to its inward biased moveable inwardly to its normal position when the pre-determined force is released from the first extension member. The first extension member may also include biasing means for biasing the first extension member in the inward direction, the biasing means moveable on application of the pre-determined force to permit movement of the first extension member in the outward direction. The manikin may be connected to the cradling surface to prevent removal of the manikin from the cradling surface.

The support may further include a releasable manikin connector comprising a first connector member cooperating with the cradling surface and a corresponding second connecting member cooperating with the manikin to releasably connect the manikin to the cradling surface, the first and second connector members releasable from one another to separate the manikin from the cradling surface on application of a pre-determined force. The first connector member may be a magnet and the second connector member may be a magnetic attractant.

BRIEF DESCRIPTION OF THE DRAWINGS

In drawings which illustrate embodiments of the invention,

FIG. 1 is a side view of a manikin and support for a manikin of the present invention, with components removed;

FIG. 2 is a further side view of the invention of FIG. 1, with components removed;

FIG. 5 is a side view of a base member connected to the support of the invention of FIG. 1;

FIG. 6 is a front view of the base member and support depicted in FIG. 5;

FIG. 9 is a side view of the support of FIG. 1 with a releasable manikin connector;

FIG. 10 is a side view of the support and connector of FIG. 9 with the training manikin rotated 90 degrees into a released position;

DETAILED DESCRIPTION OF A PREFERRED EMBODIMENT

Figure 3:
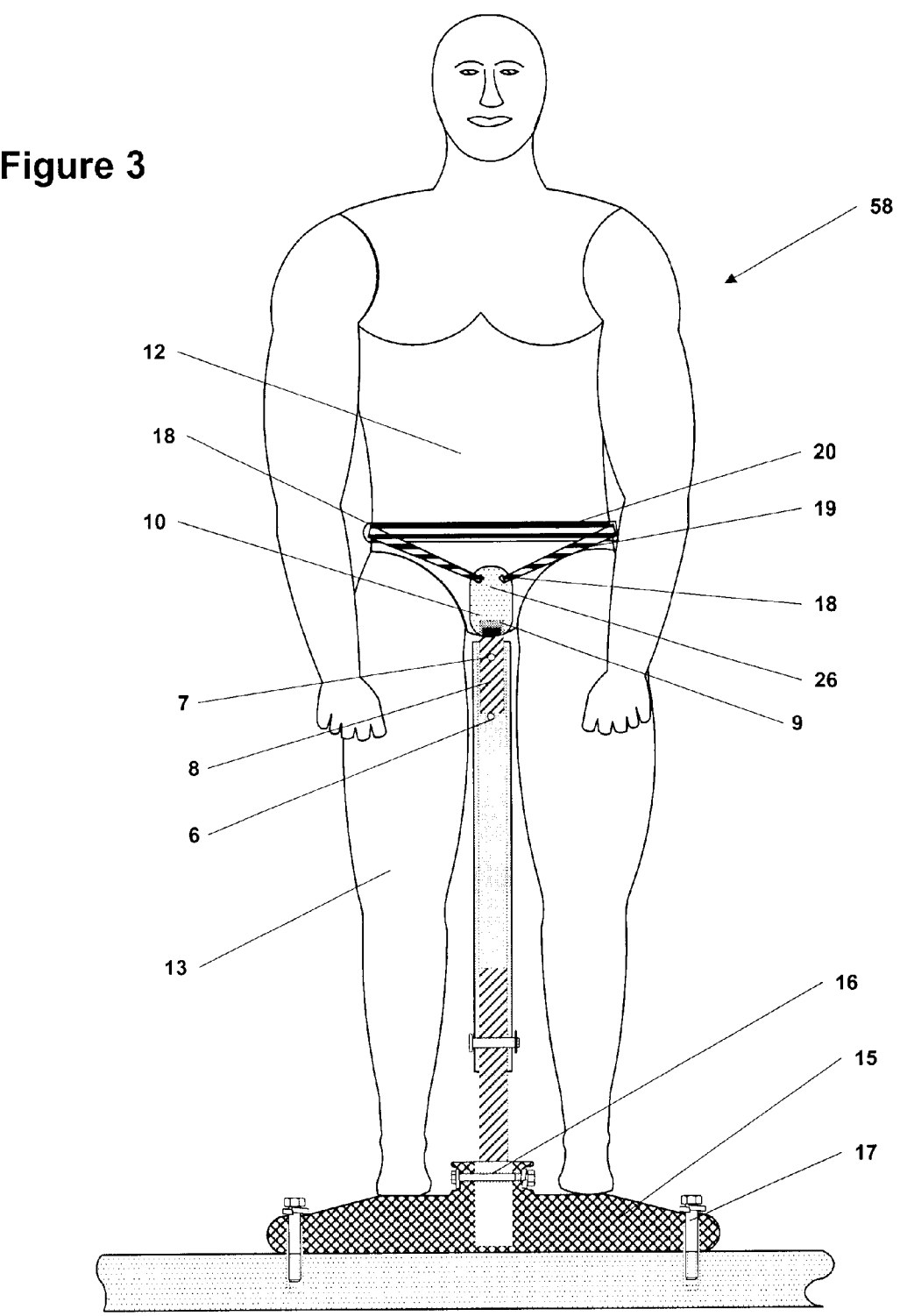
FIG. 3 is a front view of the invention of FIG. 1, showing the manikin attached to the support.

Referring initially to FIGS. 1 and 2, a right side view of training manikin 58 comprising head 102, torso 12, right arm 104, left arm (not shown), right leg 106 (with hip and upper thigh partially removed) and left leg 108, is depicted supported on support 10 on base member 13. Joints (not shown) may be used to rotatably attach right arm 104, left arm (not shown) and legs 106, 108 to manikin 58.

Referring to FIG. 1 base member 13 includes base 2 positioned on a floor. Base 2 can be a heavy cast iron or steel plate that can be optionally solidly attached to a floor surface by a commonly used bolt attachment system 17. Vertically and centrally positioned base post 3 is attached to base 2. The upper end of base post 3 includes a number of spaced through holes 4 which permit the outer height adjustment pipe 5 to slide into position to permit the insertion of a locking pin (not shown) similar to lower pin 6, in order to selectively adjust the height of support 10 on base 2. Adjustment holes 4 are aligned in a side-to-side orientation so as to reduce the potential for contact injury as the lower pins are positioned on the inside of the legs 106, 108. Pins 6 and 7 and their corresponding holes are aligned in a front to rear orientation so that pins 6 and 7 do not contact legs 106, 108 of the training manikin 58 as legs 106, 108 are moved. Pin 6 and its corresponding through-holes are positioned at the bottom end of mounting post 8 of support 10. The through-holes extending through post 8 are aligned with corresponding holes through pipe 5 when post 8 is positioned in the upper end of pipe 5 as depicted in FIG. 1. The positioning of bottom pin 6 is such that the bottom of mounting post 8 rests on bottom pin 6 permitting support 10 (and thereby training manikin 58) to rotate 360 degrees around the longitudinal axis of pipe 5. Bottom pin 6 is made of a case hardened steel and thus will not wear and obviates the need for a bearing system on which to rest the mounting post. Top pin 7 may be inserted into aligned through-holes in pipe 5 and post 8 to lock support 10 in a position such that manikin in support 10 faces a forward direction.

Post 8 is of the same diameter as post 3 and therefore inserts and rotates within pipe 5 when pin 7 is removed. A relatively short semi-circular-shaped steel plate 9 is attached to the top of post 8 about which a resiliently deformable material, for example urethane, or rubber, is formed to define support 10 and extension members 26. It is important that the support 10 and extension members 26 be wide enough to support manikin cradling surface 14 but not too wide so as to catch legs 106, 108 of the training manikin 58 thereby encumbering the throwing action of the training manikin 58 from support 10. We have found that a width of support 10 of about between 2 to 4 inches (or about 5 to 10 cm) is acceptable with a width of about 3 inches (or about 7.6 cm) being preferred. Further, the flexible urethane cover 22 when in a normal position extending upwardly and outwardly to form cradling surface 14 must offer sufficient forward and backward stabilizing support to the training manikin 58 such that training manikin 58 does not unintentionally fall off of support 10. It has been found that a urethane or rubber material comprising extension members 26 having a shore hardness range factor of between 70D and 95A provides the required level of flexible resistance with the preferred shore hardness factor being about 60D which requires about 134 N of force to deflect extension member 26. The level of force applied on manikin 58 required to deflect extension member 26 will vary with the type of skill being applied (e.g. force on the neck as compared to the waist) and the weight of the manikin as it tips either forward or backward against extension member 26. For example, with a user throwing the manikin over his/her hip the manikin would be pulled forward, lifted slightly and twisted (in a spiraling action) in a three dimensional forward, upward (briefly) and downward direction all within a very brief period of time. This action requires a flexible, yet responsive action on extension members 26.

Figure 4:
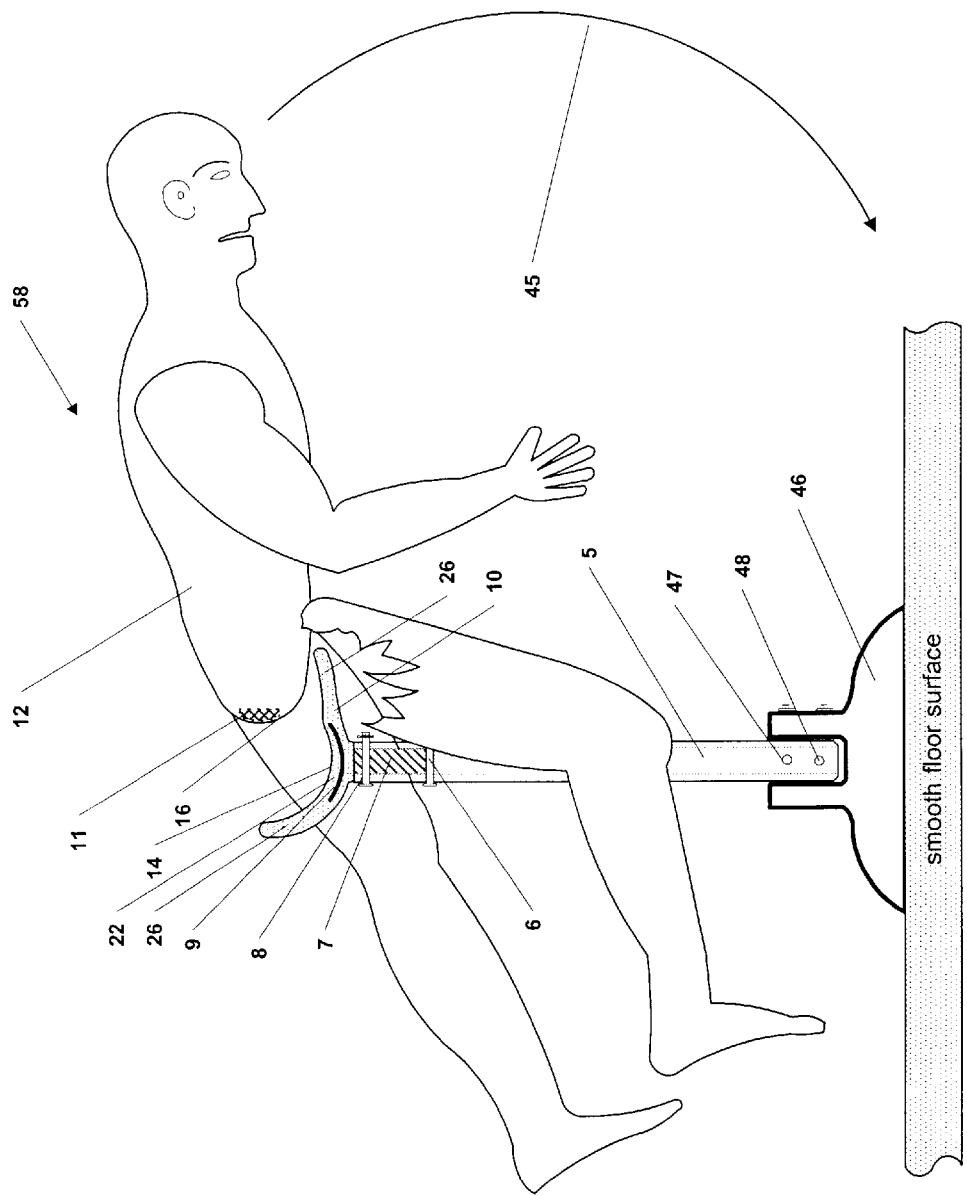
FIG. 4 is a side view of the invention of FIG. 1 showing the training manikin being rotated about an axis adjacent the cradling surface.

Manikin 58 is designed to be fairly evenly balanced about its center of gravity while resting on support 10 and will rotate about support 10 with little force applied. The resistance to rotation and removal of manikin 58 from support 10 results from the resiliency of extension members 26 and magnet 11. Preferably extension members 26 are deflectable to the position demonstrated in FIG. 4 upon application of a force of about 134 Newtons. Magnet 11 being used is manufactured to require about 267 N of pulling force to release magnet 11 from plate 9. Thus, when manikin 58 weighing 100 pounds or 45 Kg is lifted vertically the person lifting manikin 58 would be required to apply more than 160 pounds [i.e. about 712 N] of lifting force. On the other hand a person applying horizontal force would be required to overcome the resiliency of extension member 26 of about 133 Newtons plus the resistance force of magnet 11 acting on base 9 of 60 pounds (or about 267 Newtons) for a total of 400 N of force. As noted earlier, in reality these forces are rarely vertical or horizontal and thus when a throwing skill is applied to the manikin three-dimensional forces are applied to the manikin invoking rotational and-angular leveraged forces being applied at various points around the center of gravity. Our research into the design of tha support 10 and magnet 11 system demonstrates that a force of about 98 N applied forward (or backward) against the neck of the manikin 58 is sufficient to consistently release manikin 58 from the magnet 11 and cause extension member 26 to be deflected to the position as shown in FIG. 4. The stronger the magnet, the harder the urethane and the longer the extension members 26, the more securely the manikin will be attached to support 10 requiring more force to remove manikin 58 from support.

Cover 22 extends outwardly and upwardly in a curved manner (beyond plate 9) to form a pair of opposed extension members 26. Extension members 26 are normally curved upwardly and outwardly as depicted in FIGS. 1 and 2 and define cradling surface 14 on the upper surface of cover 22. Contact surface 16 located in the crotch region between legs 106, 108 of manikin 58 rests on cradling surface 14 when supported by support 10.

As depicted in FIGS. 1 and 2 manikin 58 maybe releasably secured on support 10 by means of magnet 11 (e.g. a rare earth or ceramic magnets capable of greater than 50 lbs. attractive force or about 223 Newtons) inserted into manikin 58 adjacent contact surface 16. Magnet 11 will magnetically attract steel plate 9 attached to post 5 and positioned within cover 22, to urge plate 9 and magnet 11 together to assist in releasably securing and positioning manikin 58 in an upright position on support 10. Cover 22 on support 10 may include an exposed section revealing plate 9 to facilitate magnetic attraction with magnet 11 or may include only a limited thickness of urethane cover 22 to ensure adequate magnetic attraction between magnet 11 and plate 9. If necessary, a stronger magnet may be used where a thicker urethane cover 22 covers plate 9.

Referring to FIG. 2 the training manikin torso has been moved from its vertical axis 83 to a forward position having axis 84 approximately 15 degrees from vertical axis 83 demonstrating a typical martial arts fighting stance. The manikin torso 12 is maintained in this position through the magnetic attraction of magnet 11 with steel plate 9 and based on the curved shape of contact surface 16 and corresponding curved shape of cradling surface 14. FIG. 2 also depicts an alternate base 15 which may be used to secure the base member 13 to the floor. Base 15 provides receptacle 24 for base post 3 negating the need to weld base post 3 to base 62 as demonstrated in FIG. 1. Base 2 can be a polyethylene receptacle that is hollow to be filled with steel shot, for example, to provide sufficient weight to keep base 2 on the floor as manikin 58 is moved on support 10. Having a smooth and portable base 2 provides the advantage of being usable on a matted surface without damaging the surface and is self-supporting to be used without attachment to a wall, floor or other support structure.

FIG. 3 is a frontal view of manikin 58 supported by support 10. FIG. 3 demonstrates the preferred positioning of mounting post 8 and with its bottom support pin 6 and directional locking pin 7 aligned with the front and rear of support 10.

FIG. 3 depicts the optional attachment of manikin 58 to extension members 26. Tie-down belt holes 18 are located in the top ends of extension members 26 to permit the training manikin to be secured onto support 10, if desired.

Support 10 has two forward securing belt slots 18 at upper regions on each of the front and rear extension members 26 of support 10. Slots 18 are designed to receive side-connecting belts 19 that are connected to horizontal belt 20 extending about torso 12, by means of a belt loop (not shown). A flat Velcro attachment system (not shown) may be employed to secure belt 20 about torso 12 to avoid the use of buckles or other hard members that might harm participants.

FIG. 4 depicts manikin 58 in a position being partially released from support 10. Front extension 26 of support 10 is flexed forwardly and downwardly due to forces applied through various skills on manikin 58 in the direction of arrow 45 thereby deflecting extension member 26 upon application of a pre-determined force on extension member 26. In the preferred design support 10 is formed with a radius of 3.5 inches with a pair of opposed extension member 26 curving upward forming a cradling surface 14 about 6 inches deep and constructed of shore hardness 60 D urethane 3 inches wide and 1 inch thick. Generally, a force of between 10 kg and 25 kg [about between 98 and 245 N] is a suitable force which is sufficient to deflect extension member 26 to enable manikin 58 to be moved outwardly from support 10.

Further, FIG. 4 demonstrates the use of a large and substantially constructed urethane or rubber suction cup 46 to support the vertically aligned pipe 5. It can be appreciated that pipe 5 can be constructed of a flexible urethane as well, for example a 60D durometer flexible but hard urethane, and thus permit the vertical post to flex in the direction of applied forces.

FIG. 5 depicts a close-up view of support 10 connected to base member 13 as demonstrated in FIG. 2 with the addition of four braking resistance wheels 21 (preferably a ball transfer wheel movable in any direction) that are attached to weighted base 15 using a common bolt and lock-washer system 29. Application or releasing of braking resistance on all or any of the four wheels 21 is achieved by tightening bolt handle 23. If, for example, braking resistance was applied to one of the back wheels 21 and force was applied to the front of support 10 (as when a manikin 58 resting on cradling surface 14 is pushed with sufficient force), base 15 (and training manikin 58) would then tend to rotate around the resistance wheel 21 and thus provide a directional restrictively moving target. The user can by tightening or loosening the resistance applied to the wheels 21, set the desired direction of the training manikin movement as well as the rate of travel when forces are applied on wheels 21.

FIG. 6 is a front view of FIG. 5 and 4depicts front extension member 26 with slots 18 therein. As previously discussed, extension members 26 must be wide enough such that when contact surface 16 of manikin 58 rests on cradling surface 14, manikin 58 is supported without manikin 58 tipping in a sideward direction. Preferably, extension member 26 is about 5 centimeters to 10 centimeters wide which also defines the width of cradling surface 14 which corresponds to the width of manikin 58 contact surface 16.

Figure 7:
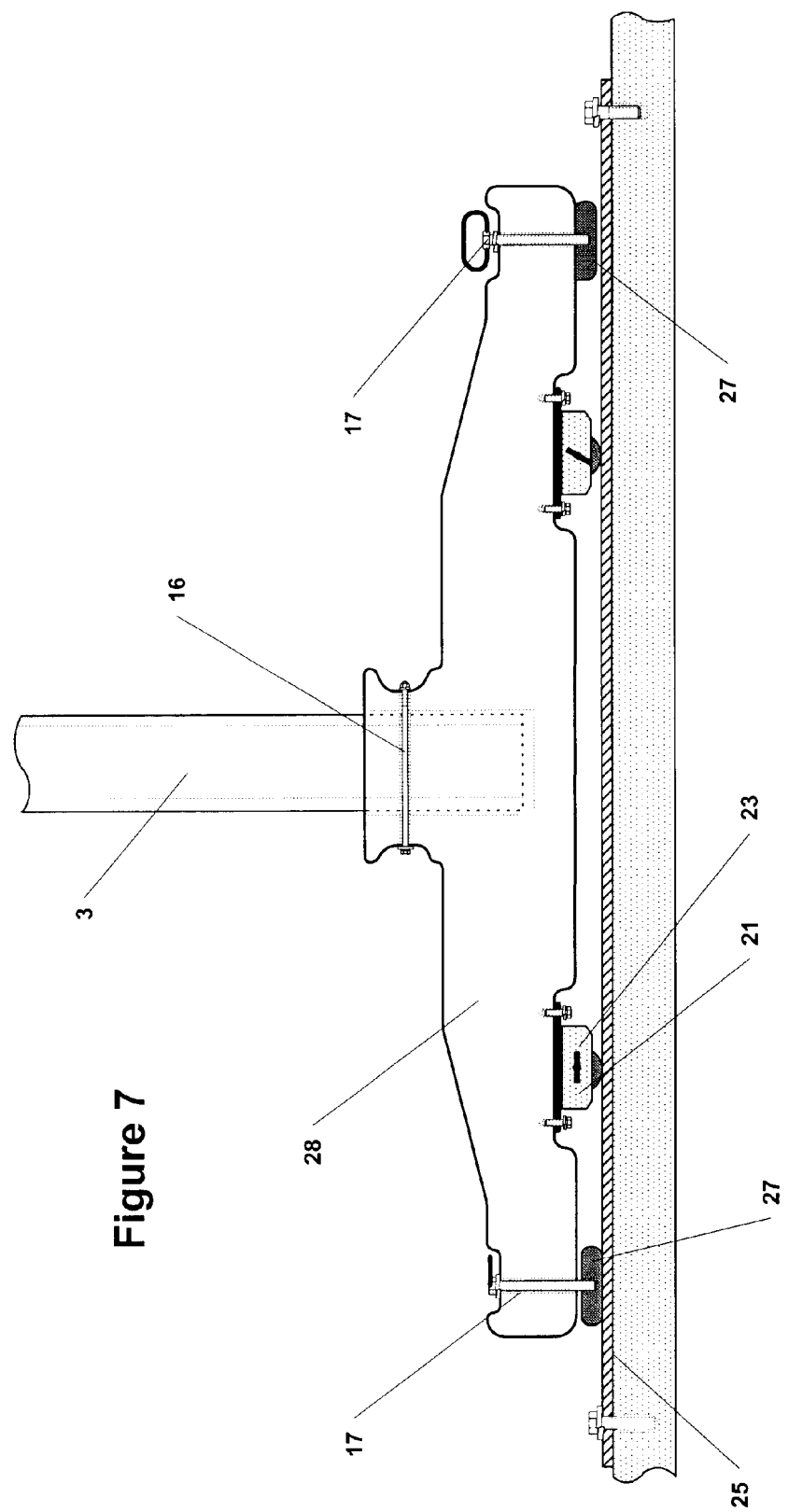
FIG. 7 is an expanded partial view of the base member depicted in FIG. 6.

FIG. 7 illustrates the attachment of magnets 27 (of 50 to 250 lbs. pull release capacity, or about 223 to 1,115 Newtons). The strength of magnets 27 depends on intended use, a weaker magnet for martial arts type training , a stronger magnet for other body contact sports programs such as football where some movement of base 28 along floor plate 25 is desired. In the final case to solidly attach base 28 to floor plate 25 and in the latter case to permit sliding motion of base 28 on floor plate 25. Magnets 27 and base 28 cannot be easily moved along floor plate 25 when magnets 27 are in direct contact with a floor plate 25. When magnets 27 are separated slightly from floor plate 25 (e.g. up to about ½ inch above floor plate 25) base 28 can be wheeled laterally easily over the plate 25 with little or no resistance from magnets 27. The magnetic force is reduced or increased in proportion to the distance separating the plate 25 and magnet 27. Using the magnetic attractive forces of magnet 27 on plate 25 in combination with the braking force on wheel 21, the user can provide a floor plate 25 of a determined area (e.g. 20 feet by 20 feet as in a boxing ring or 6 feet by 30 feet simulating a football line) and adjust the level of resistance of movement of the base on plate 25 thereby determining the amount of force required to move the manikin 28 resting on support 10 in any chosen direction on floor plate 25. The use of the magnets 27 obviates the need to fill the base 15 with steel shot as demonstrated in FIG. 5, or the need for any other weighted base structure. Magnets 27 can be selectively lowered to contact floor plate 25 to permit rotation of base 28 about the one of magnets 27 contacting floor plate 25. Lateral rotational resistance can be determined by adjusting the braking force on wheels 21. FIG. 7 depicts magnet 27 on the left lowered to engage floor plate 25 and magnet on the right raised and spaced away from floor plate 25.

It should be noted that all bases and upright support posts may be covered with protective foam so as to reduce the potential for injury.

Figure 8:
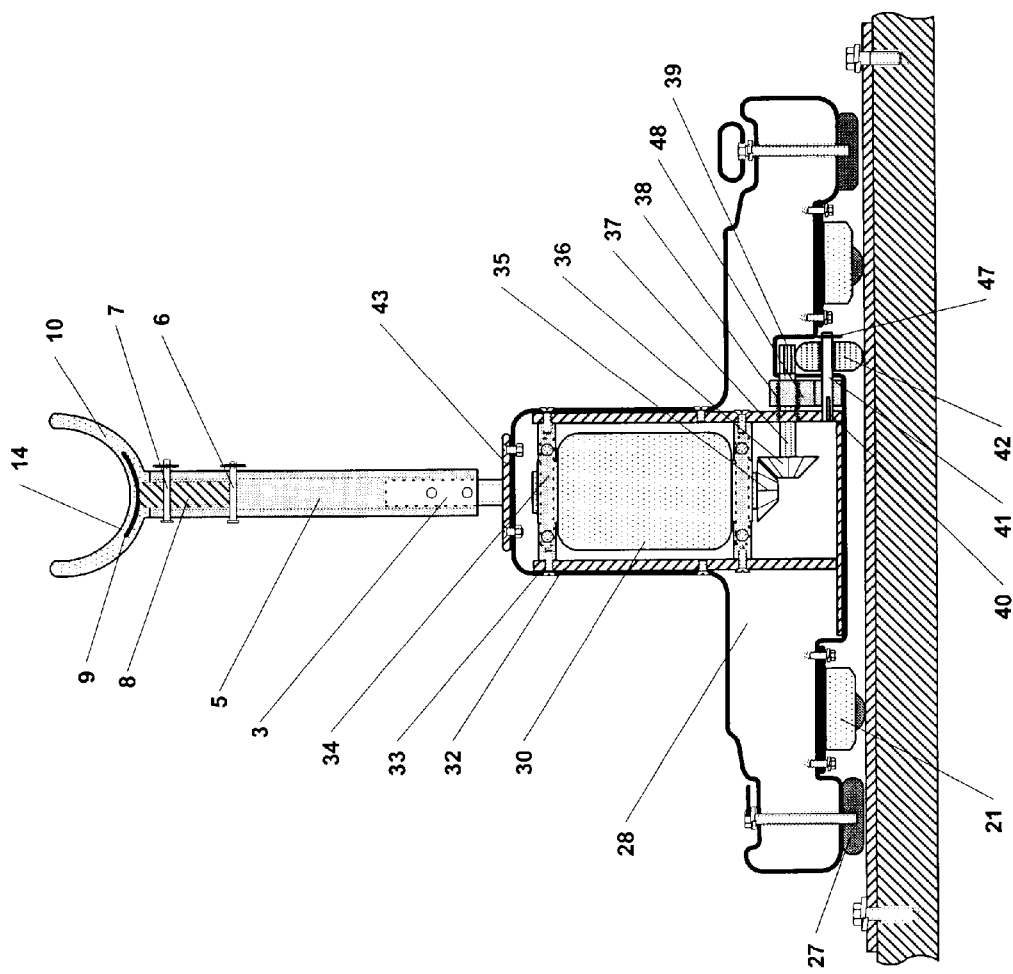
FIG. 8 is a side view of the base member of FIG. 6 with a programmable drive motor.

FIG. 8 depicts a direct current (DC) electrical motor 30 (with forward and reverse capabilities) which can be controlled remotely through interfaced written and designed computer software programs. Motor 30 is positioned and solidly attached to housing 28 in a vertically aligned, shaft down, position with a top and bottom support system 34 physically attached to housing 28 using steel stabilizers 32 with counter-sunk bolts 33.

The downward extending motor shaft is fitted with a key locked miter gear 35 (45 degree angle) that meshes with matching miter gear 36 effectively changing the directional rotation of the motored force from vertical to horizontal. Rotational forces are then transferred via shaft 37, rotatably supported and positioned by oil-light bushings 38, to floor contacting wheel 42. The end of shaft 37 is geared to ensure positive contact with the flexible outer surface wheel 42 thus turning it either forward or backward in response to a computer generated command. Wheel 42 is rotatably positioned at the end of shaft 41 and held in position by pin 47. Shaft 41 is locked in position by locking key 40 that extends through housing block 48 through motor mounting plate 32.

The computer controlled base member may be used to support and move manikin 58 to turn left or right about a radius determined by the locking of an opposite wheel 21. Using this basic system design the addition of another motor drive system (not shown) for an opposing wheel 21 could be programmed to move base 28 forward or backward as well as to rotate base 28 about a locked opposing wheel 21. The computer may instruct a mechanism to disengage wheel 21 from the power source by disengaging gear 36 from gear 35.

The attachment of support 10 to base 28 is similar to that described above and includes vertically positioned post 3 extending from base 28 and inserted into lower end of pipe 5 with mounting post 8 inserted into the upper end of pipe 5. Attachment base 43 attaches post 3 to the top of base 28.

Referring to FIG. 9, support 10 is depicted with a system for releasably retaining manikin 58 in support 10. FIG. 9 depicts manikin 58 in a pre-load position just prior to movement of manikin 58 into support 10 by moving member 58 in the direction of arrow 56. Compression spring 52 is biased to apply upward force on overlapping clamp arm system 54 causing each arm 49 of system 54 to be biased together about pin 53. The bias force of spring 52 may be overcome upon application of sufficient downward force in the direction of arrow 56 onto arms 49 of system 54. When training manikin 58 is placed into support 10 it is moved downwardly in the direction of arrow 56. Pin 55 located centrally on contact surface 16 forces arms of system 54 apart permitting pin 55 to be retained within opening 57 between arms of system 54. Bar 55 contacts the downward sloping upper inner surfaces 29 of each side of arms 49 forcing them outwards rotating about pin 53, permitting bar 55 to be seated and held between arms 49 within opening 57 between the arms spring 52 holds arms 49 together retaining bar 55 within opening 57.

Clamp arm system 54 is attached to outer pipe 5 by inserting mounting post 8 into the top of pipe 5 resting on bottom pin 6. Post 8 is restricted from rotating within post 5 by a shorter quick release pin 60 inserted into a corresponding opening in post 8. Pin 60 also prevents the release of mounting post 8 from pipe 5.

Support 10 is designed with a rectangular slot (not shown) formed centrally and longitudinally in each extension member 26 line with extension members 26 such that arms 49 are able to rotate outwardly in an unrestricted manner and such that arms 49 are forced outwardly by bar 55 when sufficient torque or lifting force of greater than 20 kg (about 196 Newtons) is applied on manikin 58. The applied force moves bar 55 upward separating arms 49 against compression spring 52 releasing bar 55 from opening 57 resulting in manikin 58 being released in the direction of the applied skill. Clamp arm system 54 is secured to support 10 by threaded eye-bolt 51 extending through post 8. The eye of bolt 51 forms the ring through which support pin 53 is inserted. The opposite end of threaded eye bolt 51 passes through and is secured to the base of mounting post 8 by a counter sunk washer and threaded nut and lock washer system 50.

Referring to FIG. 10, manikin 58 is releasable from both support 10 and clamp arm system 54 on application of a pre-determined force on manikin 58. Rotation of manikin 58 in support 10, similar to rotation of manikin 58 in the direction of arrow 45 as is depicted in FIG. 4, causes bar 55 to pull against arms 49 with a pre-determined force sufficient to overcome the biasing force of spring 52 on arms 49 through upward movement of bar 55 in the direction of arrow 59. This causes arms 49 to separate thereby releasing bar 55 from arms 49 while deflecting forward extension member 26 to release manikin 59 from support 10. Manikin 58 may also be released from support 10 and arms 49 in the opposite direction, that is in a direction rearwardly as when performing a throwing or tripping skill on manikin 58.

Figure 11:
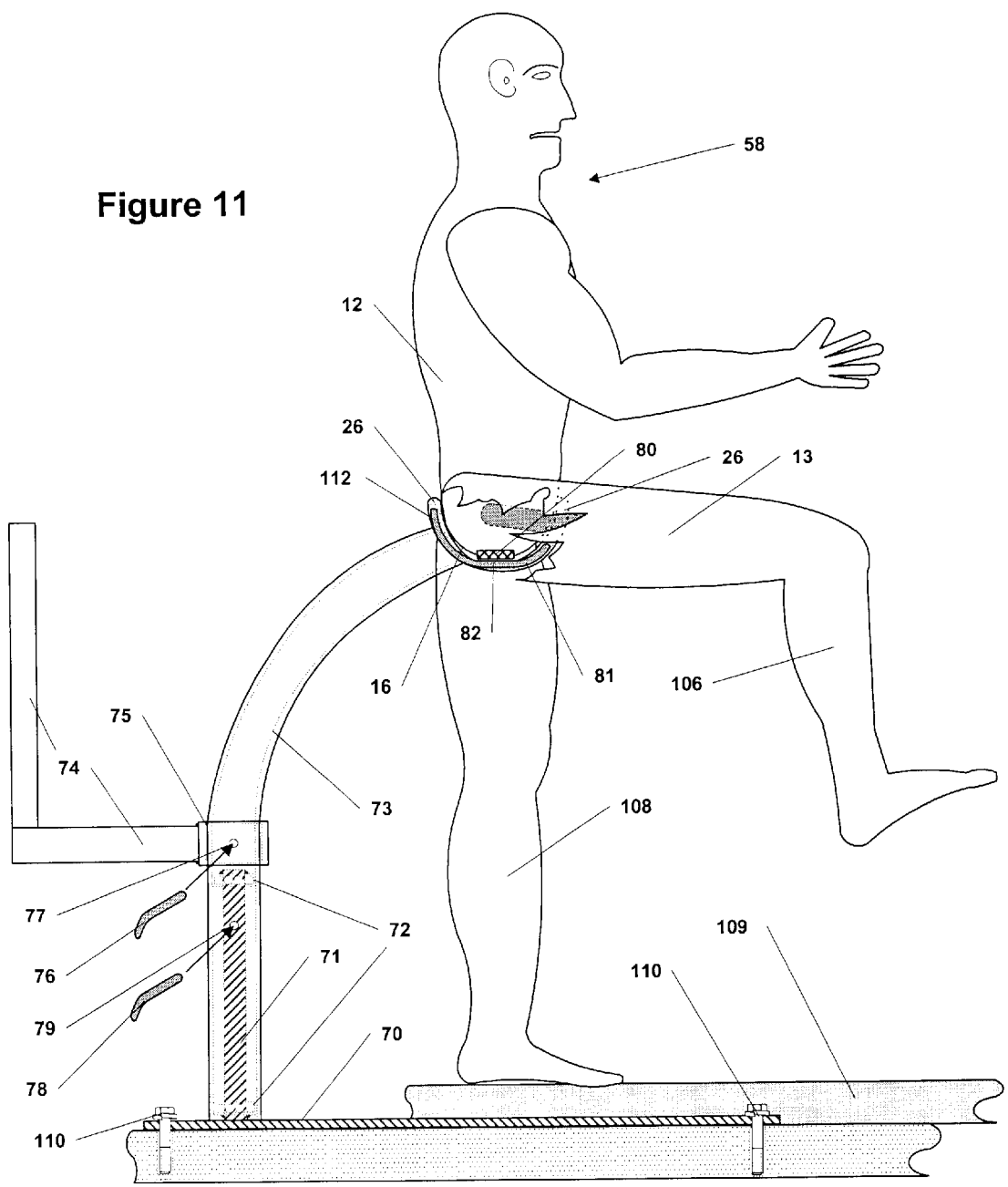
FIG. 11 is a side view of the support of FIG. 1 with an offset base member.

Referring now to FIG. 11, a substantial vertically positioned rod 71 has upper and lower ball bearings 72 with its inner ring attached to each end of the rod 71. Lower end of rod 71 is rigidly attached to base plate 70 which is attached to the floor by securing bolts 110. Arched support post 73 inside diameter is sized to fit slideably over the outer ring of bearings 72 to rest on plate 70. Arched support post 73 is arched above rod 71. The top outer end of the arched support post 73 is solidly attached to one end of support 112 curved upwardly at each of its ends and forming an underlying support structure to support manikin 58. Support 112 includes base member 81 rigidly attached at one end to post 73 and extends forwardly in generally a U-shape to define cradling surface 14. Support 112 is primarily covered by urethane with forward extension member 26 providing support and deflectable on application of a predetermined force on forward extension member 26, as previously described. However, rearward extension member 26 is not deflectable as a substantial part is rigidly attached to post 73. Base member 81 includes a flat steel portion 82 which is not covered on its upper side by urethane. Portion 82 is designed to magnetically attract magnet 80 adjacent contact surface 16 of manikin 58. Preferably portion 82 is annular as is magnet 80 as it has been found that the use of a circular magnet permits equal magnetic resistance through 360 degrees. Flat steel portion 82 is shown positioned at the upper side of support 10 to reduce the distance to magnet 80 and thereby improve magnetic attraction between magnet 80 and flat steel portion 82.

The arched support post 73 can be optionally locked in position by inserting locking pin 78 into receiving aligned post 71 and support post 73 holes 79. Otherwise post 73 is free to rotate on bearings 72.

Still referring to FIG. 11, a user may optionally attach an instructor applied and controlled rotational handle system 74. Handle mounting ring 75 is slid upwardly over the arched support post 73 before support post 73 is mounted on vertical mounting post 71. Handle 74 is securely locked to arched support post 73 by inserting pin 76 into handle 74 and arched support mount post aligned holes 77. Thus an instructor may rotate the arched support mount post around vertical mounting post 71 by moving handle 74 either left or right causing training manikin 58 to move accordingly thereby providing a user a moving target.

Figure 12:
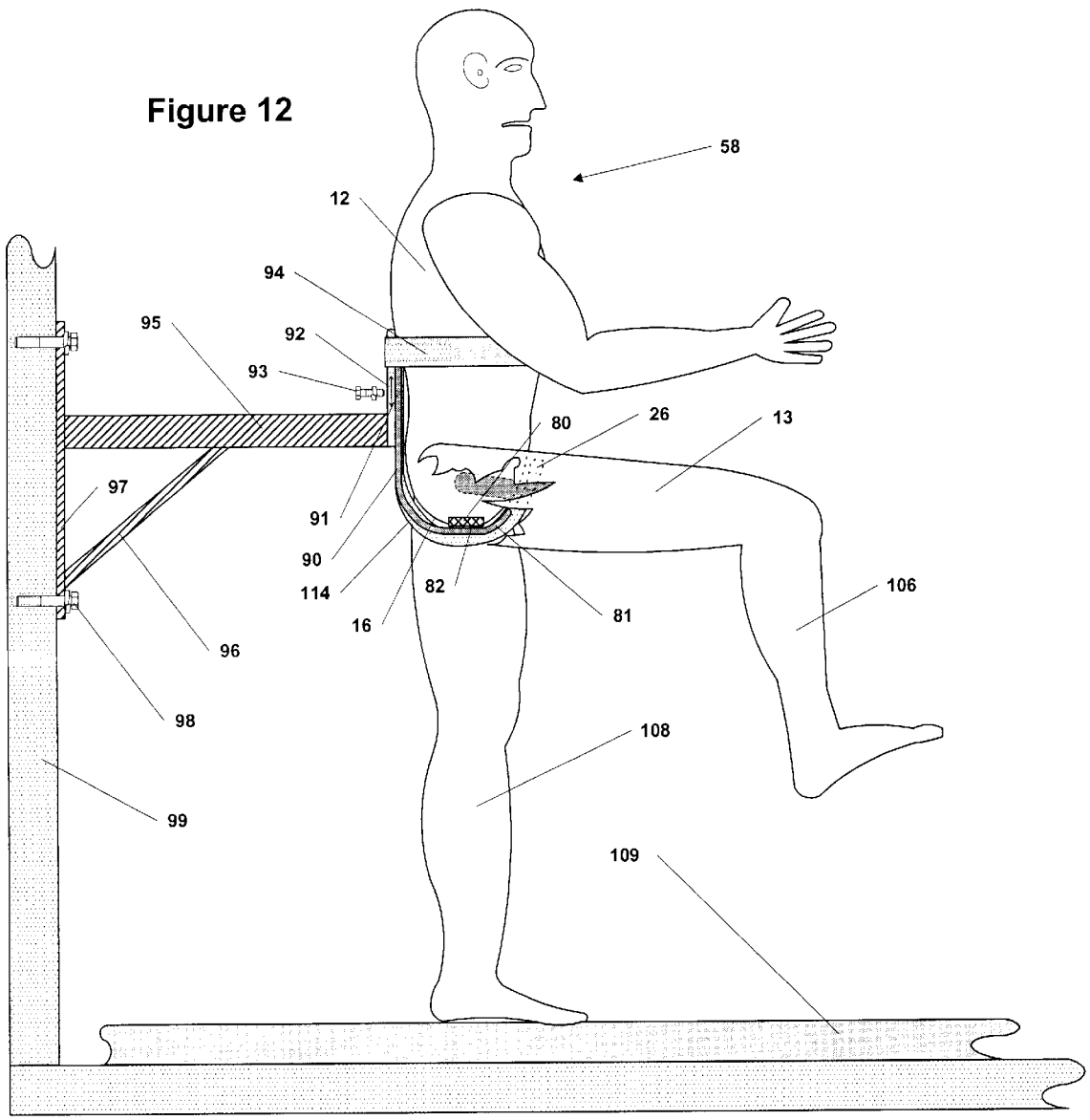
FIG. 12 is a side view of a non-symmetrical support for a manikin with a lateral base member.

Referring now to FIG. 12, a wall mounted support system for support 114 is depicted attached to wall 99. Supporting arm 95 is attached to wall mounting plate 97 that is securely attached to the wall by bolts 98. Arm 95 is further supported by strut 96. Arm end plate 92 is attached to the outer end of arm 95 and has channels (not shown) which accept bolts 93 to permit the slideable height adjustment of plate 90 by tightening or loosening bolts 93. Plate 90 includes threaded through holes 91 designed and located to receive threaded bolts 93. Thus plate 90 can be fastened securely to arm 95 by tightening bolts 93. As described previously, front extension member 26 is moveable on application of a pre-determined force to deflect as depicted in FIG. 4 to permit rotation or lateral movement of manikin 58 in a forward direction away from arm 95.

Optionally, the upward extension of plate 92 may include belt loops (not shown) attached to the back of plate 92 to receive belt 94 that securely attaches manikin 58 to support 114. The wall mounted system depicted in FIG. 12 permits movement of legs 106, 108 in a forward or rearward direction thus permitting law enforcement trainers to practice handcuffing skills wherein the hands are cuffed behind the back.

We claim:

1. A support for a manikin comprising:
   (a) first and second opposed extension members when normally positioned cooperating to form a cradling surface to support the manikin;
   (b) a base member connector for connecting the extension members to a base member;
   (c) the first extension member comprising biasing means for biasing the first extension member in an inward direction toward the second extension member to return to its normal position, the first extension member moveable from its normal position in an outward direction away from the second extension member upon application of a pre-determined force on the first extension member;
   wherein when the manikin is supported in the cradling surface the manikin may be moved in an outward direction on movement of the first extension member in the outward direction on application of the pre-determined force.

2. The support as described in claim 1 wherein the biasing means is a spring.

3. The support as described in claim 1 wherein the extension members are configured to so that the cradling surface generally conforms to the shape of a corresponding contact surface on the manikin.

4. The support as described in claim 1 wherein the manikin is removable from the cradling surface in the outward direction when the first member is deflected on application of the predetermined force.

5. The support as described in claim 1 wherein the manikin is returned to a rest position when the first extension member returns to its normal position on release of the pre-determined force.

6. The support as described in claim 1 wherein the manikin may be connected to the cradling surface to prevent removal of the manikin from the cradling surface.

7. The support as described in claim 1 further comprising a releasable manikin connector comprising a first connector member cooperating with the cradling surface and a corresponding second connector member cooperating with the manikin to releasably connect the manikin to the cradling surface, the first and second connector members releasable from one another to separate the manikin from the cradling surface on application of a predetermined force.

8. The support as described in claim 7 wherein the first connector member is a magnet and the second connector member is a magnetic attractant.

9. The support as described in claim 8 wherein the first extension member further comprises a reinforcement member to prevent deflection of the first extension member beyond a predetermined position in the outward direction and wherein the reinforcement member acts as the magnetic attractant.

10. The support as described in claim 7 wherein the first connector member is a hook fastener and the second connector member is a corresponding loop fastener.

11. The support as described in claim 7 wherein the first connector member is a releasable hook and the second connector member is a flange securable in the hook.

12. The support as described in claim 7 wherein the releasable manikin connector cooperates with the first extension member to release the manikin from the cradling surface upon application of the predetermined force on the first extension member.

13. The support as described in claim 1 wherein the first and second extension members are integral with one another.

14. The support as described in claim 1 wherein each extension member extends upwardly and away from the other extension member to form the cradling surface in the region between the extension members when the first extension member is in its normal position.

15. The support as described in claim 1 wherein when the first extension member is in the normal position it prevents a manikin supported in the cradle surface from rotating about an axis adjacent the cradling surface and on application of the predetermined force on the first extension member the manikin is free to rotate about the axis so that the upper part of the manikin is rotatable in the outward direction.

16. The support as described in claim 1 wherein the first extension member further comprises a reinforcement member preventing the movement of the first extension member beyond a predetermined position in the outward direction.

17. The support as described in claim 1 further comprising an attachment member for attaching the manikin to the first extension member.

18. The support as described in claim 17 wherein the attachment member comprises an elongated belt member for surrounding the manikin and attached to the first extension member.

19. The support as described in claim 1 further comprising an attachment member for attaching the manikin to the first and second extension members.

20. The support as described in claim 19 wherein the attachment member comprises an elongated belt member for surrounding the manikin and attached to the first and second extension members.

21. The support as described in claim 1 wherein the second extension member is biased in an inward direction toward the first extension member to return to its normal position and movable from its normal position in an outward direction away from the first extension member upon application of a second pre-determined force on the second extension member.

22. The support as described in claim 21 wherein the second extension member is resiliently deformable so as to be movable in the outward direction on application of the second predetermined force and due to its inward bias movable inwardly to its normal position when the second predetermined force is released from the second extension member.

23. The support as described in claim 21 wherein the second extension member further comprises biasing means for biasing the second extension member in the inward direction, said biasing means movable on application of the second predetermined force to permit movement of the second extension member in the outward direction.

24. The support as described in claim 23 wherein the biasing means is a spring.

25. The support as described in claim 1 further comprising a base member connected to the base member connector for supporting the support on a support surface.

26. The support as described in claim 25 wherein the base member is rigidly held with respect to the support surface by means of either a plurality of bolts connecting the base to the support surface, a base filled with heavy material or a base comprising a suction cup gripping the support surface through suctional forces.

27. A manikin and manikin support combination, comprising:
(a) a manikin having a contact surface;
(b) first and second opposed extension members when normally positioned cooperating to form a cradling surface to support the manikin, the extension members separated from one another a distance which is greater than the width of the manikin at the contact surface contacting the extension members when the manikin is resting on the cradling surface, to permit the manikin to be positioned loosely on the cradling surface;
(c) a base member connector for connecting the extension members to a base member;
(d) the first extension member biased in an inward direction toward the second extension member to return to its normal position and moveable from its normal position in an outward direction away from the second extension member upon application of a pre-determined force on the first extension member;
wherein when the manikin is supported in the cradling surface the manikin may be moved in an outward direction on movement of the first extension member in the outward direction on application of the pre-determined force.

28. A support for a manikin comprising:
(a) first and second opposed extension members when normally positioned cooperating to form a cradling surface to support the manikin;
(b) a base member connector for connecting the extension members to a base member;
(c) the first extension member biased in an inward direction toward the second extension member to return to its normal position and moveable from its normal position in an outward direction away from the second extension member upon application of a predetermined force on the first extension member;
wherein when the manikin is supported in the cradling surface the manikin may be moved in an outward direction on movement of the first extension member in the outward direction on application of the pre-determined force and wherein when the first extension member is in the normal position it prevents a manikin supported in the cradle surface from rotating about an axis adjacent the cradling surface and on application of the predetermined force on the first extension member the manikin is free to rotate about the axis so that the upper part of the manikin is rotatable in the outward direction.

29. A support for a manikin comprising:
(a) first and second opposed extension members when normally positioned cooperating to form a cradling surface to support the manikin;
(b) a base member connector for connecting the extension members to a base member;
(c) the first extension member biased in an inward direction toward the second extension member to return to its normal position and moveable from its normal position in an outward direction away from the second extension member upon application of a pre-determined force on the first extension member;
(d) the first extension member comprising a reinforcement member preventing the movement of the first extension member beyond a predetermined position in the outward direction;
wherein when the manikin is supported in the cradling surface the manikin may be moved in an outward direction on movement of the first extension member in the outward direction on application of the pre-determined force.

30. A support for a manikin comprising:
(a) first and second opposed extension members when normally positioned cooperating to form a cradling surface to support the manikin;
(b) a base member connector for connecting the extension members to a base member;
(c) the first extension member biased in an inward direction toward the second extension member to return to its normal position and moveable from its normal position in an outward direction away from the second extension member upon application of a pre-determined force on the first extension member;
(d) a releasable manikin connector comprising a first connector member cooperating with the cradling surface and a corresponding second connector member cooperating with the manikin to releasably connect the manikin to the cradling surface, the first and second connector members releasable from one another to separate the manikin from the cradling surface on application of the pre-determined force on the first extension member;
wherein when the manikin is supported in the cradling surface the manikin may be moved in an outward direction on movement of the first extension member in the outward direction on application of the predetermined force.

* * * * *